United States Patent [19]
Classe et al.

[11] 3,752,123
[45] Aug. 14, 1973

[54] ANIMAL CAGE

[75] Inventors: Anthony V. Classe, New York, N.Y.;
Robert P. Mehn, Middletown, N.J.

[73] Assignee: Maryland Plastics Incorporated,
Federalsburg, Md.

[22] Filed: Dec. 1, 1971

[21] Appl. No.: 203,604

[52] U.S. Cl. .................................................. 119/17
[51] Int. Cl. ...................... A01k 31/06, A01k 01/00
[58] Field of Search .................... 119/15, 17, 18, 22

[56] References Cited
UNITED STATES PATENTS

| | | | |
|---|---|---|---|
| 3,518,971 | 7/1970 | Gass et al. | 119/18 |
| 1,986,501 | 1/1935 | Conway et al. | 119/18 X |
| 3,397,676 | 8/1968 | Barney | 119/15 |

*Primary Examiner*—Hugh R. Chamblee
*Attorney*—Norman N. Holland

[57] ABSTRACT

The present invention comprises an animal cage lid which has a removable wire mesh bottom.

2 Claims, 7 Drawing Figures

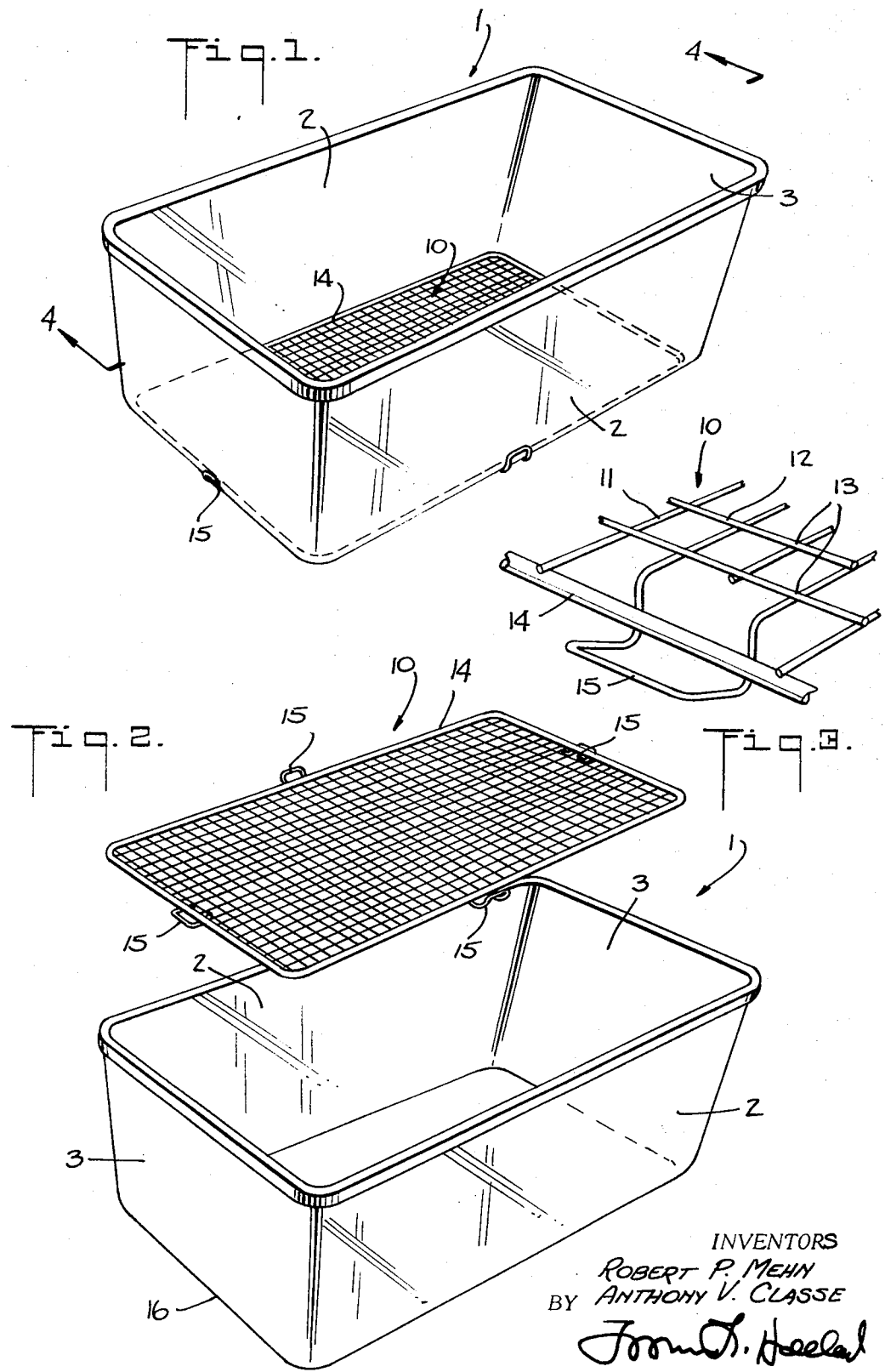

INVENTORS
ROBERT P. MEHN
ANTHONY V. CLASSE
BY
ATTORNEY

ANIMAL CAGE

DESCRIPTION

The present invention is directed to an improved animal cage and more particularly to an improved animal cage which has a removable bottom wall.

Animal cages usually comprise a lower main body and an upper cage lid. In the past, the lower main body of the animal cage has been made of a solid transparent material, such as plastic, with integral and one piece bottom and side walls.

It has been found that such cages frequently become dirty and have to be periodically cleaned. Since the bottoms of the cages are quite deep, cleaning of these cages is an involved operation. In addition, the corners of the cages formed by the bottom and the side walls are particularly difficult to clean because of the small space. Furthermore, such cages are necessarily put out of operation while they are being cleaned.

One solution to this problem has been to form a cage with openings in the bottom such as the cage shown in U.S. Pat. No. 3,397,676. However, in that particular cage, the bottom is quite thick and each opening has vertically extending side walls. It would appear that the vertically extending side walls of the openings combined with the thick bottom would make it even more difficult to clean because there are additional surfaces on which dirt can accumulate. Furthermore, it is believed that the bottom shown in said patent is permanently mounted in the cage so that the entire cage must be removed from operation until the bottom is cleaned.

The present invention overcomes these drawbacks and has for one of its objects an improved animal cage in which the bottom is made of a mesh type construction which will not accumulate dirt.

Another object of the present invention is the provision of an improved animal cage in which the bottom is easily removed for cleaning purposes.

Another object of the present invention is the provision of an improved animal cage in which the bottom can be removed for cleaning purposes without the necessity of special tools.

Another object of the present invention is the provision of an improved animal cage in which the bottom is preferably made of a material that cannot be chewed by the animal.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view of the cage lid made in accordance with the present invention;

FIG. 2 is an exploded view thereof;

FIG. 3 is a detail of the snap lock feature;

Figure 4:
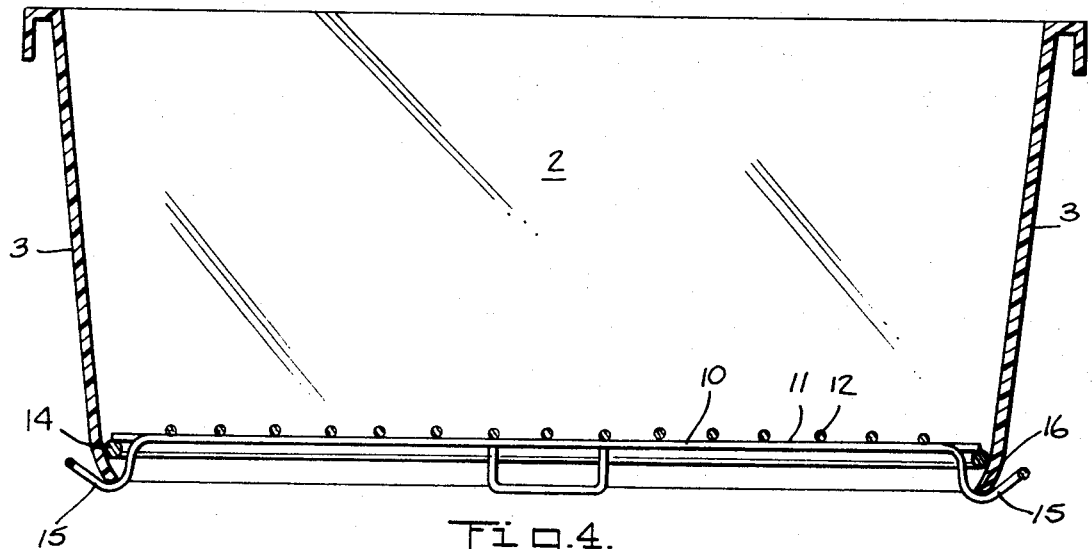
FIG. 4 is a sectional view taken along line 4—4 of FIG. 1.

Referring more particularly to the drawings, the cage 1 comprises integral side and end walls which are preferably made of a plastic material which is preferably transparent. The side and end walls 2 and 3 are shown tapered inwardly in a downward direction although straight walls may also be used if desired. The bottom edge of the walls 2 and 3 is tapered inwardly for a purpose to be more fully described hereinbelow.

A removable bottom 10 is made preferably from a wire mesh material and is adapted to permit a laboratory animal to walk thereon. The bottom 10 has crossed wires 11 and 12 welded or otherwise held together at their points of intersection 13 and are held together by a reinforced strengthening frame 14 with wires 11 and 12 crisscrossing each other. The wires 11 and 12 are preferably made of small round metal gauge material and do not have any appreciable depth so that accumulation of dirt is kept at a minimum. The bulk of the dirt will fall through the mesh. The wires are welded, soldered or in any other manner mounted onto the frame 14.

Snap hooks 15 are formed at opposite edges of the frame 14 and are in the form of resilient curved upwardly biased hooks. Preferably each snap hook 15 is formed by a pair of wires 11 and 12 extending beyond the frame 15 and being integral with each other.

When the bottom 10 is placed within the cage and snapped in place, the snap locks flex and move past the lower edge of the side and end walls and rests therebeneath so that the bottom will not be raised. The frame 14 lies on the inwardly extending lower edge 16 of the walls 11 and 12 so that the bottom does not fall through. The frame 14 and lower edge 16 are of such strength that the weight of the animal will not force the bottom 10 to fall through the opening. In addition, the gauge of the mesh material forming wires 11 and 12 is such that the bottom 10 will be able to support the animal. Since the bottom 10 is made of metal wire gauge material, it cannot be chewed by an animal.

Figure 5:
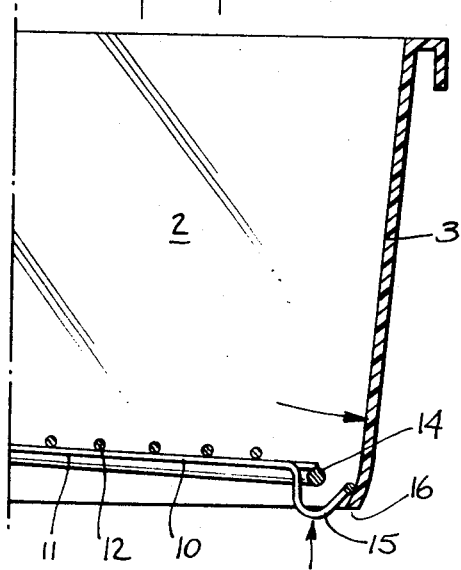
FIG. 5 is a detail showing the manner of removing the bottom.
Figure 6:
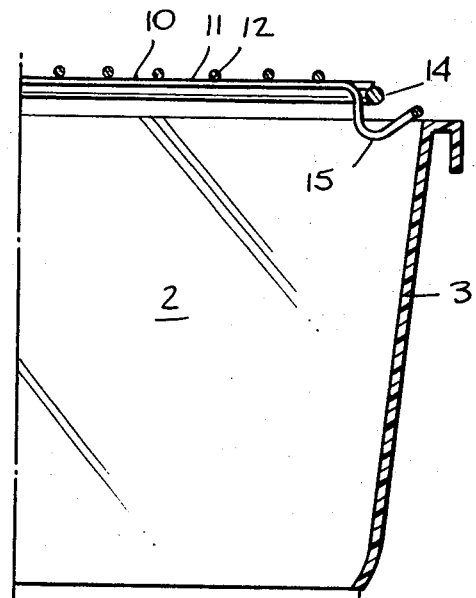
FIG. 6 is a detail showing the bottom being removed.
Figure 7:
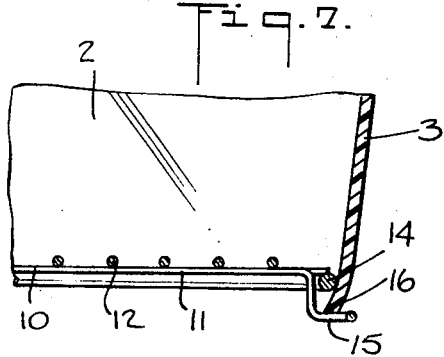
FIG. 7 is a detail showing the bottom in place.

When it is desired to remove the bottom, pressure is applied to the lower part of the side and end walls 11 and 12 and the snap lock 15 is bent downwardly as shown in FIG. 5 until the lower edge 16 of the end walls 11 and 12 are clear of the snap lock 15, at which point the bottom can be raised and removed as shown in FIG. 6.

It will thus be seen that the present invention provides an improved cage in which the bottom is made of a mesh type construction which will not accumulate dirt, which is easily removed for cleaning purposes without the necessity of special tools and which the bottom is preferably made of a material that cannot be chewed by the animal.

As many and varied modifications of the subject matter of this invention will become apparent to those skilled in the art from the detailed description given hereinabove, it will be understood that the present invention is limited only as provided in the claims appended hereto.

We claim:

1. An animal cage comprising a body portion having resilient upwardly and outwardly sloping side and end walls, a bottom removably mounted to at least some of said walls, said bottom having a plurality of openings in close adjacency to each other, said openings extending throughout the entire area of the bottom with said openings being formed by a plurality of intersecting metal wires, the height to said openings being substantially the same as the width of the separating means forming the openings, a frame surrounding said intersecting wires and attached to said wires and engaging lower portions of said walls, removable means comprising snap lock means to permit removal of said bottom, said snap lock means being resilient and adapted to lie beneath the lower edge of said walls when the bottom is in place in the cage, said opposed snap lock means extending beyond the lower edges of the side walls to resiliently engage the same to maintain the bottom in place, said snap lock means being integral with at least some of said wires.

2. An animal cage comprising a body portion having side and end walls, a bottom removably mounted to at least some of said walls, said bottom having a plurality of openings in close adjacency to each other, said openings extending throughout the entire area of the bottom with said openings being formed by a plurality of intersecting metal wires and the height to said openings being substantially the same as the width of the separating means forming the openings, a frame surrounding said intersecting wires attached to the wires, removable means comprising snap lock means, said snap lock means being resilient and adapted to lie beneath the lower edge of said walls when the bottom is in place in the cage, opposed snap locks extending from opposed edges of the frame of the bottom, the lower edge of the side walls extending inwardly in order to support the frame therewithin when the bottom is in place.

* * * * *